(12) United States Patent
Gaebe et al.

(10) Patent No.: US 7,352,924 B2
(45) Date of Patent: Apr. 1, 2008

(54) MICRO-OPTICAL DEVICE

(75) Inventors: Carl E. Gaebe, Blacksburg, VA (US);
Noel A. Heiks, Radford, VA (US);
David W. Sherrer, Radford, VA (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 0 days.

(21) Appl. No.: 11/545,908

(22) Filed: Oct. 11, 2006

(65) Prior Publication Data

US 2007/0092178 A1    Apr. 26, 2007

Related U.S. Application Data

(60) Provisional application No. 60/725,196, filed on Oct. 11, 2005.

(51) Int. Cl.
*G02B 6/12*    (2006.01)
(52) U.S. Cl. .......................................... 385/14; 385/49
(58) Field of Classification Search ................. 385/14, 385/52, 53, 88, 89, 76, 77, 49, 129, 130, 385/131, 132
See application file for complete search history.

(56) References Cited

U.S. PATENT DOCUMENTS

| | | | | |
|---|---|---|---|---|
| 4,732,446 A | * | 3/1988 | Gipson et al. | 385/24 |
| 4,863,232 A | * | 9/1989 | Kwa | 385/89 |
| 5,076,688 A | * | 12/1991 | Bowen et al. | 356/73.1 |
| 5,177,804 A | * | 1/1993 | Shimizu et al. | 385/20 |
| 5,502,785 A | | 3/1996 | Wang et al. | 385/92 |
| 5,790,730 A | | 8/1998 | Kravitz et al. | 385/49 |
| 6,654,523 B1 | | 11/2003 | Cole | 385/52 |
| 6,801,693 B1 | * | 10/2004 | Jacobowitz et al. | 385/50 |
| 6,839,492 B2 | | 1/2005 | Kwon et al. | 385/50 |
| 2002/0154847 A1 | | 10/2002 | Dutt et al. | 385/14 |
| 2003/0123838 A1 | * | 7/2003 | Wang et al. | 385/140 |
| 2003/0169422 A1 | | 9/2003 | Mukai | 356/399 |
| 2004/0264866 A1 | | 12/2004 | Sherrer et al. | 385/49 |
| 2005/0111797 A1 | | 5/2005 | Sherrer et al. | 385/93 |
| 2007/0092178 A1 | * | 4/2007 | Gaebe et al. | 385/14 |

FOREIGN PATENT DOCUMENTS

| | | | |
|---|---|---|---|
| EP | 1 202 084 | 5/2002 | |
| EP | 1 279 979 | 1/2003 | |
| JP | 10123373 | 5/1998 | |
| JP | 10307238 | 11/1998 | |
| JP | 2004-245853 A | 9/2004 | 385/88 X |

OTHER PUBLICATIONS

European Search Report of corresponding European Application No.:06 25 5223. No date.

* cited by examiner

*Primary Examiner*—Brian M. Healy
(74) *Attorney, Agent, or Firm*—Jonathan D. Baskin

(57) ABSTRACT

The present invention provides a micro-optical device which may be used as an optical pigtailing assembly for waveguides. In an exemplary configuration the assembly includes a first chip which includes an optoelectronic component and an optical fiber. The optical fiber and optoelectronic component are coupled with an optical component, such as one or more waveguides on an integrated optic chip.

12 Claims, 3 Drawing Sheets

MICRO-OPTICAL DEVICE

Figure 1:
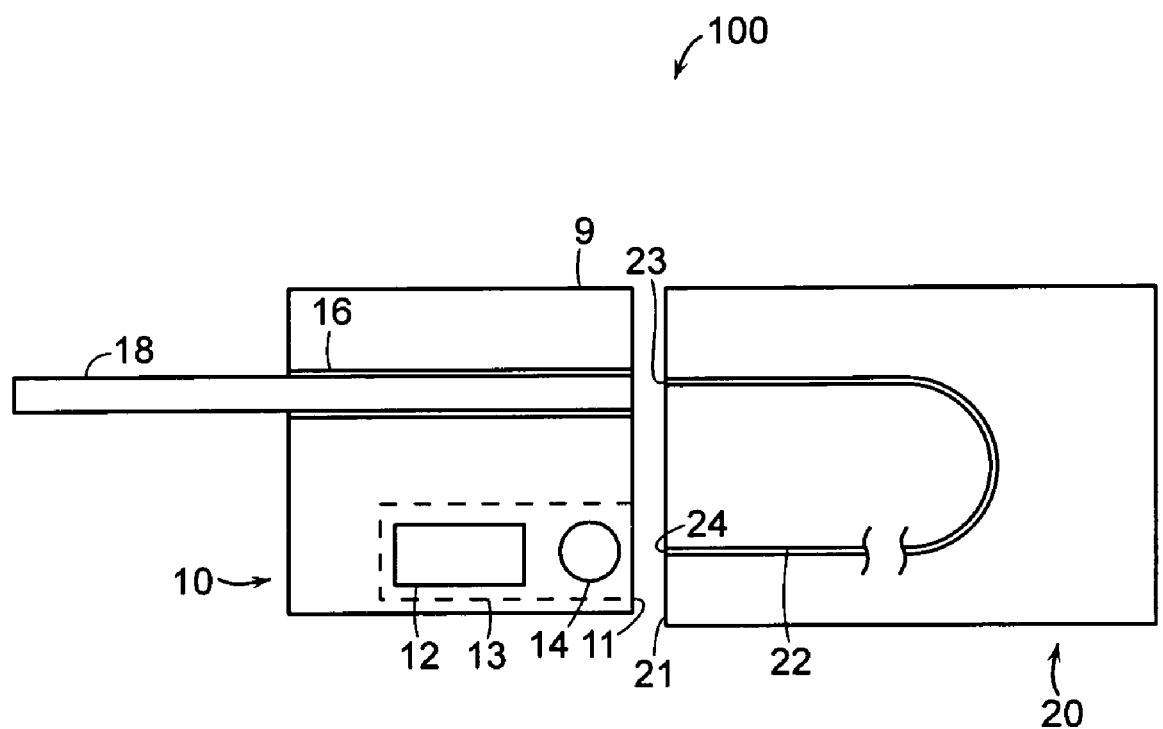

The present invention relates generally to micro-optical devices. More particularly, the present invention relates to micro-optical devices that may be used as pigtailing assemblies which include a pigtailing chip having an optoelectronic component and an optical fiber that optically coupled with an optical component, for example, one or more waveguides on an integrated optic chip.

Integrated optic chips (IOCs), also referred to as waveguide chips or planar lightwave circuits, are often pigtailed (or attached) to optical fibers. U.S. Pat. No. 6,839,492, to Kwon et al, discloses such a structure. Often this pigtailing is done using a glass, ceramic, or silicon ferrule, containing one or more fibers either singularly or in a precision array. The edge of the waveguide and the fiber pigtailing assembly are butt-coupled, aligned, and bonded together allowing the light to pass with limited loss between the optical fibers and the integrated optic chip. However, a challenge in building waveguide devices has been to achieve high performance and low cost while additionally incorporating active devices such as lasers and photodetectors. Historically active devices are either packaged separately and joined to the waveguide with an optical fiber that runs between the devices, or the active devices are placed directly onto the integrated optic chip. To couple between the active device and the waveguides on the chip, various methods, including the use of grating couplers and embedded microreflectors in the integrated optic chip have been used. These features are made to move the optical light to an elevation out of the plane of the optical waveguides by reflecting, refracting, or diffracting the light. Incorporation of such features into the waveguide die is usually expensive and requires additional processing steps. Therefore, there is a need in the art for technology that provides optical assemblies that permit high-performance, low-cost coupling of active optical devices with optical components such as waveguides and optical fibers.

The present invention provides a micro-optical device. The micro-optical device includes: a first chip which includes a substrate, an optoelectronic component on the substrate oriented to optically communicate across a first region of an edge of the substrate, and an optical fiber on the substrate oriented to optically communicate across a second region of the substrate edge; and an optical component oriented to optically communicate with the optoelectronic component and the optical fiber across the first and second edge regions, respectively. The optical component is disposed proximate to the first chip in an optical path between the optoelectronic component and the optical fiber. In one configuration, the optical component is an optical waveguide. The micro-optical device may include a second chip, for example, an integrated optic chip, which includes the optical component.

Figure 2:
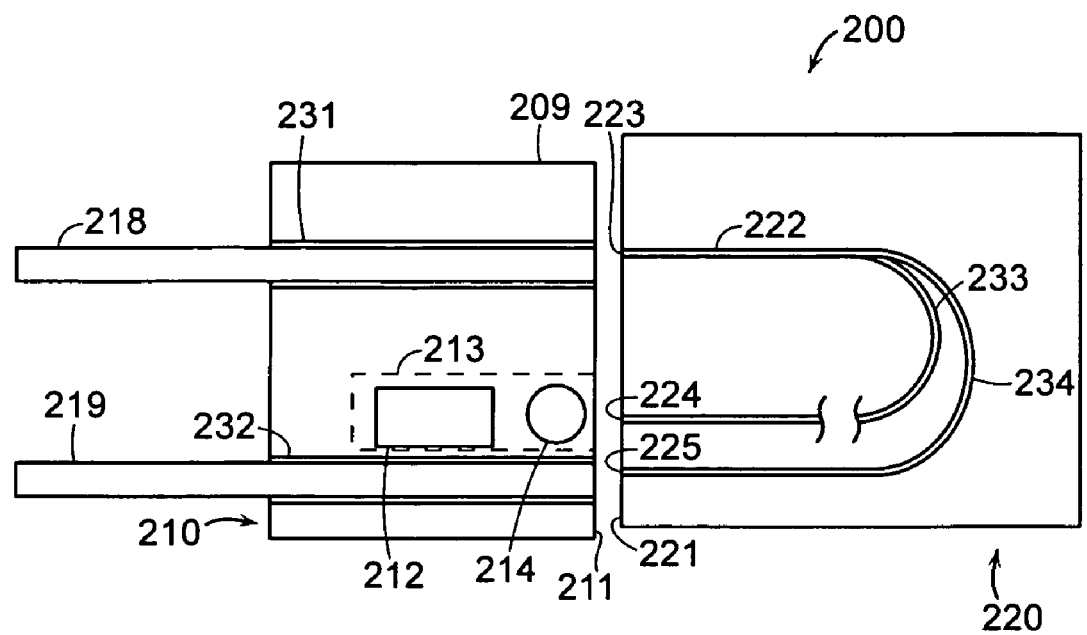
Figure 3:
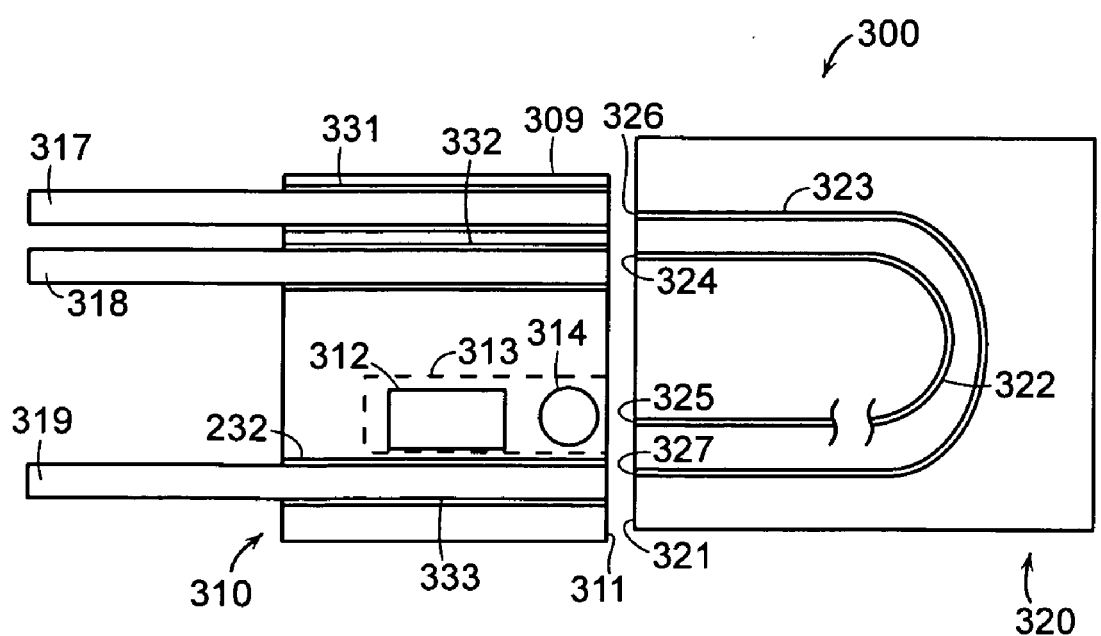
Figure 4A:
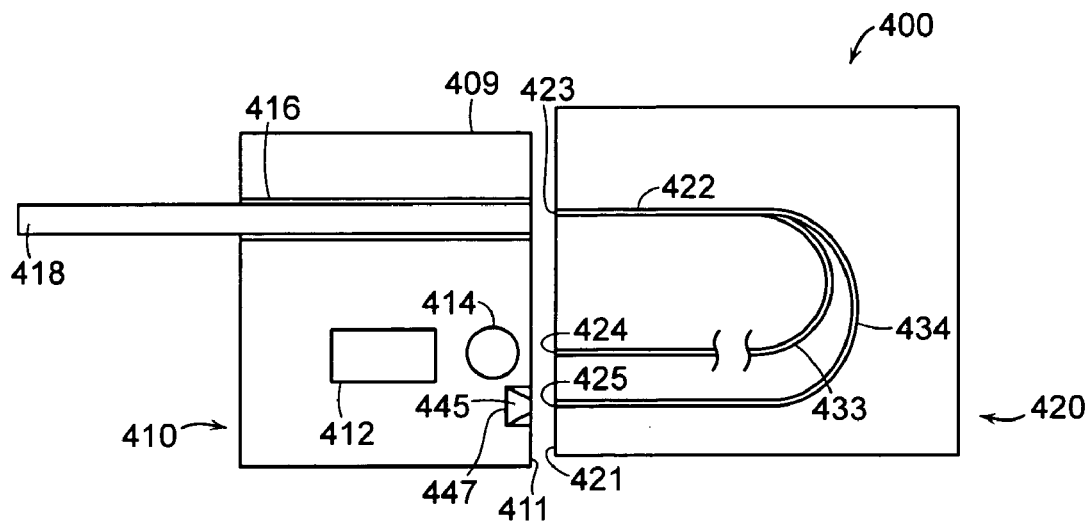
Figure 4B:
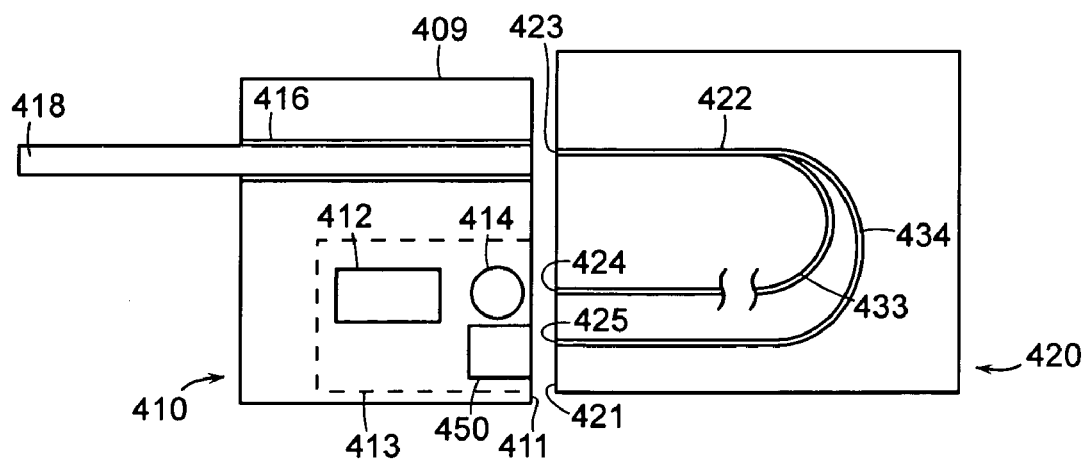

The foregoing summary and the following detailed description of the present invention will be best understood when read in conjunction with the appended drawings, in which:

FIG. 1 schematically illustrates a micro-optical device in accordance with the present invention including a pigtailing chip having an optoelectronic component and an optical fiber disposed thereon and including an integrated optic chip butt-coupled to the pigtailing chip to permit optical communication between the optoelectronic component and the optical fiber;

FIG. 2 schematically illustrates a micro-optical device in accordance with the present invention including a pigtailing chip having an optoelectronic component and first and second optical fibers disposed thereon and including an integrated optic chip butt-coupled to the pigtailing chip to permit optical communication between the optoelectronic component and the first optical fiber and to permit optical communication between the first fiber and the second fiber;

FIG. 3 schematically illustrates a micro-optical device in accordance with the present invention including a pigtailing chip having an optoelectronic component and first, second, and third optical fibers disposed thereon and including an integrated optic chip butt-coupled to the pigtailing chip to permit optical communication between the optoelectronic component and the second optical fiber and to permit optical communication between the first fiber and the third fiber;

FIG. 4A schematically illustrates a micro-optical device in accordance with the present invention including a pigtailing chip having an optoelectronic component, optical fiber, and a reflector facet disposed thereon and including an integrated optic chip butt-coupled to the pigtailing chip to permit optical communication between the optoelectronic component and the optical fiber and to permit optical communication between the optical fiber and the reflector facet; and FIG. 4B schematically illustrates the micro-optical device of FIG. 4A, having a surface emitting device disposed over the reflector facet in optical communication with the reflector facet.

Referring now to the figures, wherein like elements are numbered alike throughout, a micro-optical device, generally designated 100, in accordance with the present invention is provided. The pigtailing assembly 100 includes a pigtailing subassembly, such as pigtailing chip 10, which includes a substrate 9, an active device, such as an optoelectronic component 12, and includes an optical channel, such as an optical fiber 18. As used herein, the term "optoelectronic component" includes active devices that emit, detect, or otherwise alter an optical beam, including for example optical sources, optical detectors, and MEMS devices. The term "optical component" includes optical elements, such as optical waveguides, optical fibers, lenses, gratings, prisms, filters, and so forth. As used herein, the term "a" and "an" are intended to encompass one or more. The term "on" is not limited to elements being directly in contact with each other, but may also include intervening layers, structures and space.

The optoelectronic component 12 and optical fiber 18 are typically oriented on the pigtailing chip 10 so that the optoelectronic component 12 and optical fiber 18 optically communicate across a first and second region, respectively, of a single edge of the substrate 9, such as coupling edge 11. Such a configuration of the optoelectronic component 12 and optical fiber 18, where optical communication of these elements takes place across a single edge 11, permits the optoelectronic component 12 and optical fiber 18 to be butt-coupled to an optical component, such as one or more waveguides on an integrated optic chip 20, for example, at a single coupling edge 11 of the pigtailing chip 10. The integrated optic chip 20 includes a waveguide 22 configured to permit optical communication between the optoelectronic component 12 and the optical fiber 18 when the integrated optic chip 20 is butt-coupled to the pigtailing chip 10.

The integrated optic chip 20 provides one or more functions, indicated by the broken lines, for example, wavelength multiplexing, wavelength demultiplexing, optical attenuation, optical amplification, switching, modulation, and mode conversion. The integrated optic chip may further include one or more additional active and/or passive devices (e.g., lasers, photodetectors, integrated circuits, drivers, filters, lenses, prisms) thereon or formed therein. High delta-n waveguides such as those based on silicon oxynitrides or semiconductors such as silicon, indium phosphide and gallium arsenide, or photonic crystal devices, are particularly suitable due to their ability to be fabricated with small geometries. Thus, the present invention provides a micro-optical pigtailing assembly 100 that permits optical communication between the optoelectronic component 12 and an optical channel, such as optical fiber 18, via an optical component such as a waveguide 22, which may be provided as part of an integrated optic chip. In one exemplary application, the micro-optical assemblies of the invention may be used in a triplexer configuration. Such a configuration finds use, for example, in fiber-to-the-home applications, for example, using 1490 nm and 1550 nm incoming and 1310 nm outgoing signals.

Turning now to FIG. 1 in more detail, the pigtailing chip 10 desirably contains at least one active device, such as an optoelectronic component 12, and at least one optical channel, such as an optical fiber 18. Optionally, an optical component, such as a lens 14, may be provided on the pigtailing chip in optical communication with the optoelectronic component 12 to facilitate the coupling of light to or from the optical component 12. (As used herein, the term "light" is not limited to the visible spectrum, but includes electromagnetic radiation outside of the visible spectrum.). The active device 12 alone or together with other optional components, such as optical component 14 or other active devices, may optionally be hermetically enclosed so as to form part of a hermetically sealed package 13. Such a structure may include, for example, a transparent wall or lid through which an optoelectronic signal to and/or from the optoelectronic component may pass, or a hermetic coating such as a low-temperature CVD coating over the optoelectronic component.

The optoelectronic component 12 and optical fiber 18 are desirably provided on the same substrate 9, so that manufacturing processes, such as photolithographic processes, may be used to accurately establish the relative position of the optoelectronic component 12 to that of the optical fiber 18. For example, the pigtailing chip may desirably be single-crystal silicon, which is amenable to photolithographic processing. In particular, the location of the optical fiber 18 may be determined by providing a V-groove 16 disposed on the upper surface of the pigtailing chip 10. The V-groove 16 may be created by etching a single crystal silicon wafer using established or other suitable methods. For example, the V-groove 16 may be provided by anisotropic etching of a (100) silicon wafer so that the surfaces of the V-groove 16 are {111} crystallographic planes. During the same anisotropic etching process, the locations of the optoelectronic component 12 and ball lens 14 may be established. For instance, the location of the ball lens 14 may be established by providing a pyramidal-shaped pit or V-pit which may be etched at the same time as the V-groove 16, whereby the V-pit also includes surfaces that are {111} crystallographic planes. Likewise, the location of the optoelectronic component 12 may be established during the same etching step to provide an appropriately shaped cavity into which the optoelectronic component 12 may be seated. Other suitable chip materials and manufacturing processes may also be used that permit precise positioning of the optoelectronic component 12 and optical fiber 18 relative to one another, along with any other optional components, for example, by deposition and etching processes to form alignment fiducials for seating the optoelectronic and optical components.

The optoelectronic component 12 (along with optional lens 14) and optical fiber 18 are oriented on the pigtailing chip 10 so that the optoelectronic component 12 and optical fiber 18 may communicate across (e.g., over, under, or through) a single coupling edge 11 of the pigtailing chip 10, to permit the optoelectronic component 12 and optical fiber 18 to be optically coupled by butt-coupling to a single optical component. For example, the optoelectronic component 12 and optical fiber 18 may be simultaneously butt-coupled to an integrated optic chip 20. In this regard, the integrated optic chip 20 includes an optical waveguide 22 which may include first and second ends 23, 24 disposed at a coupling surface 21 of the integrated optic chip 20. The first end 23 and the second end 24 of the waveguide 22 may be optically coupled to the optical fiber 18 and the optoelectronic component 12, respectively, by placing the coupling edge 21 of the integrated optic chip 20 in facing opposition to the coupling edge 11 of the pigtailing chip 10, so that the waveguide and pigtailing chips 20, 10 are butt-coupled to one another. To verify that the waveguide ends 23, 24 are properly aligned with the optical fiber 18 and the optoelectronic component 12, respectively, to maximize optical coupling, the optoelectronic component 12 may be powered or interrogated during the process of aligning the pigtailing chip 10 and integrated optic chip 20.

For instance, if the optoelectronic component 12 includes a light source, such as a laser, the laser may be activated to emit light that is received by the waveguide 22 and delivered to the optical fiber 18. A detector may be provided to monitor the output of the optical fiber 18 to detect when the chips 10, 20 are best aligned to maximize the optical throughput. Alternatively, for example, if the optoelectronic component 12 includes a detector, a light source may be coupled to the optical fiber 18 at the end of the fiber 18 distal to the coupling edge 11, so that the optoelectronic component 12 can detect when the chips 10, 20 are best aligned to maximize the optical throughput. Once the optimal location of the chips 10, 20 is determined, the chips 10, 20 can be bonded together allowing the light to pass with limited loss between the optical fiber 18, optoelectronic component 12, and waveguide 22. In some cases, however, it may be inconvenient or undesirable to power or interrogate the optoelectronic component 12 during coupling of the pigtailing chip 10 to the integrated optic chip 20. In such a case, it may be desirable to provide an additional optical channel on each of the pigtailing chip 10 and the integrated optic chip 20, as illustrated in FIG. 2, to permit passive alignment of the pigtailing chip 10 and integrated optic chip 20.

For example, with reference to FIG. 2, another exemplary configuration of a pigtailing assembly, generally designated 200, in accordance with the present invention is illustrated. Except where noted, the description above with reference to FIG. 1 is applicable to FIG. 2 and to the other exemplified aspects of the invention. The pigtailing assembly 200 includes a pigtailing subassembly, such as pigtailing chip 210, which includes a substrate 209, an active device, such as optoelectronic component 212 and optional lens 214, and includes at least two optical channels, such as signal fiber 218 and alignment fiber 219. The active device 212 alone or together with other optional components, such as optical component 214 or other active devices, may optionally be hermetically enclosed so as to form part of a hermetically sealed package 213 such as described above with reference to FIG. 1. In a similar manner to the pigtailing chip configuration of FIG. 1, the optoelectronic component 212, signal fiber 218, and alignment fiber 219 are desirably oriented on the pigtailing chip 210 so that the optoelectronic component 212, signal fiber 218, and alignment fiber 219 optically communicate across first, second and third regions, respectively, of a single edge of the substrate 209, such as coupling edge 211, to permit the optoelectronic component 212, signal fiber 218, and alignment fiber 219 to be optically coupled by butt-coupling to a single optical component.

Provision of a second optical channel, for example, alignment fiber 219, permits alignment between the pigtailing chip 210 and optical component such as waveguides on integrated optic chip 220, without powering or interrogating the optoelectronic component 212. The pigtailing chip 210 may be provided by the manufacturing processes described above with respect to the pigtailing chip 10 of FIG. 1. In particular, the locations of the fiber 218, 219 may be determined by providing V-grooves 231, 232 disposed in the upper surface of the substrate 209, and the location of the optoelectronic component 212 may be established at the same step to provide an appropriately shaped cavity into which the optoelectronic component 212 may be seated. For typical applications, such as those which include single-mode 1300-1600 nm communication devices, the precision with which the components (e.g., fibers 218, 219 and optoelectronic device 212) are located relative to one another may be, for example, within several microns or less. The integrated optic chip 220 includes a waveguide 222 configured to permit optical communication between the signal fiber 218 and the optoelectronic component 212 and between the signal fiber 218 and the alignment fiber 219 when the integrated optic chip 220 is butt-coupled to the pigtailing chip 210. In this regard the waveguide 222 includes a loopback waveguide 233 to permit optical communication between the signal fiber 218 and the optoelectronic component 212, and a tap waveguide 234 to permit optical communication between the signal fiber 218 and the alignment fiber 219, respectively.

The optoelectronic component 212, signal fiber 218, and alignment fiber 219 may be simultaneously butt-coupled to integrated optic chip 220. The integrated optic chip 220 includes an optical waveguide 222 which may desirably include first, second, and third ends 223, 224, 225 disposed at a coupling surface 221 of the integrated optic chip 220. The first end 223 of the waveguide 222 may be optically coupled to the signal fiber 218, the second end 224 to the optoelectronic component 212, and the third end 225 to the alignment fiber 219 by placing the coupling edge 221 of the integrated optic chip 220 in facing opposition to the coupling edge 211 of the pigtailing chip 210, so that the waveguide and pigtailing chips 220, 210 are butt-coupled to one another. To verify that the waveguide ends 223, 224 are properly aligned with the signal fiber 218 and the optoelectronic component 212 to maximize optical coupling, the optoelectronic component 212 need not be powered or interrogated during the process of aligning the pigtailing chip 210 and integrated optic chip 220. Instead, proper alignment may be verified by monitoring optical communication between the signal fiber 218 and alignment fiber 219.

For instance, a light source may be coupled to either the alignment fiber 219 or the signal fiber 218 at a respective end of the fiber 218, 219 distal to the coupling edge 211. In addition, a detector may be provided at the distal end of the other fiber 218, 219 to which the light source is not coupled so that the detector can detect when the chips 210, 220 are best aligned to maximize the optical throughput. Once the optimal location of the chips 210, 220 is determined, the chips 210, 220 can be bonded together allowing the light to pass with limited loss between the signal fiber 218, optoelectronic component 212, and waveguide 222. Thus, by providing an external light source and an external detector, the optoelectronic component 212 need not be powered or interrogated during the alignment process.

Still further, another exemplary configuration of a pigtailing assembly in accordance with the present invention, that may be aligned without the need to power or monitor an optoelectronic component 312 is illustrated in FIG. 3 and generally designated 300. The pigtailing assembly 300 includes a pigtailing subassembly, such as pigtailing chip 310, which includes a substrate 309, an active device, such as an optoelectronic component 312 and an optional lens 314, and includes at least three optical channels, such as a signal fiber 318 and first and second alignment fibers 317, 319. The active device 312 alone or together with other optional components, such as optical component 314 or other active devices, may optionally be hermetically enclosed so as to form part of a hermetically sealed package 313 such as described above with reference to FIG. 1. In a similar manner to the pigtailing chip configuration of FIG. 2, the optoelectronic component 312, signal fiber 318, and alignment fibers 317, 319 are desirably oriented on the pigtailing chip 310 so that the optoelectronic component 312, signal fiber 318, and alignment fibers 317, 319 optically communicate across first, second, third and fourth regions, respectively, of a single edge of the substrate 309, such as coupling edge 311. In particular, the locations of the signal fiber 318 and alignment fibers 317, 319 may be determined by providing V-grooves 331, 332, 333 disposed in the upper surface of the pigtailing chip 310, and the location of the optoelectronic component 312 may be established at the same step by providing an appropriately shaped cavity into which the optoelectronic component 312 may be seated.

Provision of second and third optical channels, for example, alignment fibers 317, 319, permits alignment between the pigtailing chip 310 and optical component such as one or more waveguides on an integrated optic chip 320 to be accomplished via dedicated alignment channels, for example, alignment fibers 317, 319. Like the pigtailing chip 210 of the configuration of FIG. 2, the pigtailing chip 310 may be provided by similar manufacturing processes having similar precision with which the components are located relative to one another.

The integrated optic chip 320 includes a signal loopback waveguide 322 configured to permit optical communication between the signal fiber 318 and the optoelectronic component 312, and includes an alignment loopback waveguide 323 configured to permit optical communication between the first alignment fiber 317 and the second alignment fiber 319 when the integrated optic chip 320 is butt-coupled to the pigtailing chip 310. The optoelectronic component 312, signal fiber 318, and alignment fibers 317, 319 are oriented on the pigtailing chip 310 so that the signal fiber 318 optically communicates with the optoelectronic component 312 and the alignment fibers 317, 319 communicate with one another across a single coupling edge 311 of the pigtailing chip 310, to permit the optoelectronic component 312, signal fiber 318, and alignment fibers 317, 319 to be optically coupled by butt-coupling to an optical component.

The optoelectronic component 312, signal fiber 318, and alignment fibers 317, 319 may be simultaneously butt-coupled to integrated optic chip 320. In this regard, the signal loopback waveguide 322 which may desirably include first and second ends 324, 325 disposed at a coupling surface 321 of the integrated optic chip 320. The first end 324 of the signal loopback waveguide 322 may be optically coupled to the signal fiber 318, and the second end 325 to the optoelectronic component 312. Similarly, the alignment loopback waveguide 323 may desirably include first and second ends 326, 327 disposed at the coupling surface 321 of the integrated optic chip 320. The first end 326 of the alignment loopback waveguide 322 may be optically coupled to the first alignment fiber 317, and the second end 327 to the second alignment fiber 319. Thus, the first and second alignment fibers 317, 319, as well as the signal fiber 318 and optoelectronic component 312, may be brought into respective optical communication by placing the coupling edge 321 of the integrated optic chip 320 in facing opposition to the coupling edge 311 of the pigtailing chip 310, so that the waveguide and pigtailing chips 320, 310 are butt-coupled to one another.

As with the configuration of FIG. 2, the optoelectronic component 312 need not be powered or interrogated during the process of aligning the pigtailing chip 310 and integrated optic chip 320. Instead, proper alignment may be verified by monitoring optical communication between the alignment fibers 317, 319. For instance, a light source may be coupled to either of the first and second alignment fibers 317, 319 at an end of the alignment fiber 317, 319 distal to the coupling edge 311. In addition, a detector may be provided at the distal end of the other alignment fiber 317, 319 to which the light source was not coupled so that the detector can detect when the chips 310, 320 are best aligned to maximize the optical throughput. Once the optimal location of the chips 310, 320 is determined, the chips 310, 320 can be bonded together allowing the light to pass with limited loss between the signal fiber 318 and optoelectronic component 312. Thus, by providing an external light source and an external detector, the optoelectronic component 312 need not be powered or interrogated during the alignment process.

In yet a further exemplary configuration of a pigtailing assembly in accordance with the present invention, generally designated 400, a pigtailing assembly is illustrated in FIGS. 4A and 4B which is particularly suited for pigtailing a surface emitting (or receiving) device 450, such as a vertical cavity surface emitting laser (VCSEL) or photodetector, for example. The pigtailing assembly 400 includes a pigtailing subassembly, such as pigtailing chip 410, which includes a substrate 409, an active device, such as an optoelectronic component 412 and an optional lens 414, and includes an optical channel, such as an optical fiber 418. Optionally, the pigtailing chip 410 may include a surface emitting device 450 with or without the optoelectronic component 412. Either or both of the active devices 412, 450 together with other optional components, such as optical component 414 and other active devices, may optionally be hermetically enclosed so as to form part of a hermetically sealed package 413 such as described above with reference to FIG. 1. The location of the optical fiber 418 may be determined by providing a V-groove 416 disposed in the upper surface of the substrate 409. In addition, the pigtailing chip 410 includes a reflector facet 445, which may desirably be provided in the pigtailing chip is a {111} crystallographic plane in (100) silicon.

The surface emitting device 450 may be desirably disposed over the reflector facet 445 so that the surface emitting device 450 optically communicates with the reflector facet 445, as illustrated in FIG. 4B. The reflector facet 445 is oriented relative to a coupling edge 411 of the pigtailing chip 410 so that the surface emitting device 450 optically communicates across the coupling edge 411 of the pigtailing chip 410. Thus, the optoelectronic component 412, surface emitting device 450, and optical fiber 418 are desirably oriented on the pigtailing chip 410 so that the optoelectronic component 412, surface emitting device 450, and optical fiber 418 optically communicate across a single edge of the substrate 409, such as coupling edge 411, to permit the optoelectronic component 412, surface emitting device 450, and optical fiber 418 to be optically coupled by butt-coupling to an optical component. The pigtailing chip 410 may be provided by the manufacturing processes described above with respect to the pigtailing chip 10 of FIG. 1. For example, the reflector facet 445 may be provided as a surface of a partial V-pit 447. The V-pit 447 with reflector facet 445 may be manufactured by anisotropic etching of a (100) silicon wafer during the same step in which the V-groove 416 is provided. For typical applications, such as those which include single-mode 1300-1600 nm communication devices, the precision with which the components (e.g., fiber 418, surface emitting device 450, and optoelectronic device 412) are located relative to one another may be, for example, within several microns or less.

The integrated optic chip 420 includes a waveguide 422 configured to permit optical communication between the optical fiber 418 and each of the optoelectronic component 412 and the surface emitting device 450 when the integrated optic chip 420 is butt-coupled to the pigtailing chip 410. In this regard the waveguide 422 includes a loopback waveguide 433 to permit optical communication between the optical fiber 418 and the optoelectronic component 412, and a tap waveguide 434 to permit optical communication between the optical fiber 418 and the surface emitting device 450.

For example, the optoelectronic component 412, optical fiber 418, and surface emitting device 450 may be simultaneously butt-coupled to integrated optic chip 420. The optical waveguide 422 may desirably include first, second, and third ends 423, 424, 425 disposed at a coupling surface 421 of the integrated optic chip 420. The first end 423 of the waveguide 422 may be optically coupled to the optical fiber 418, the second end 424 to the optoelectronic component 412, and the third end 425 to the surface emitting device 450 by placing the coupling edge 421 of the integrated optic chip 420 in facing opposition to the coupling edge 411 of the pigtailing chip 410, so that the waveguide and pigtailing chips 420, 410 are butt-coupled to one another.

To verify that the waveguide ends 423, 424, 425 are properly aligned with the optical fiber 418, optoelectronic component 412, and surface emitting device 450, respectively, either the optoelectronic component 412 or the surface emitting device 450 may be powered or interrogated during the process of aligning the pigtailing chip 410 and integrated optic chip 420 in a similar manner as that described above with reference to the configuration of FIG. 1.

These and other advantages of the present invention will be apparent to those skilled in the art from the foregoing specification. For example, multiple optoelectronic components may be provided on a single pigtailing chip, along with optional waveguide structures on an integrated optic chip for optical communication with each optoelectronic component. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A micro-optical device, comprising:
   a first chip, comprising:
      a substrate;
      an optoelectronic component on the substrate oriented to optically communicate across a first region of an edge of the substrate; and
      an optical fiber on the substrate oriented to optically communicate across a second region of the substrate edge; and
   an optical component oriented to optically communicate with the optoelectronic component and the optical fiber across the first and second edge regions, respectively, wherein the optical component is disposed proximate to the first chip in an optical path between the optoelectronic component and the optical fiber.

2. The micro-optical device of claim 1, comprising a second chip coupled to the first chip, wherein the second chip comprises the optical component.

3. The micro-optical device of claim 2, wherein the second chip is an integrated optic chip, and the optical component comprises a plurality of waveguides.

4. The micro-optical device of claim 3, wherein the integrated optic chip comprises an active device thereon or formed therein.

5. The micro-optical device of claim 1, wherein the first chip comprises a second optical fiber on the substrate oriented to optically communicate across a third region of the substrate edge.

6. The micro-optical device of claim 5, wherein the optical component is disposed in an optical path between the first optical fiber and the second optical fiber.

7. The micro-optical device of claim 5, wherein the optical component comprises one or more optical waveguides in a tap configuration, a loop-back configuration, or a combination thereof.

8. The micro-optical device of claim 5, wherein the first optical fiber and the second optical fiber are configured such that an external light source and detector, respectively, may be connected thereto to allow alignment of the first chip to the optical component without activating the optoelectronic component.

9. The micro-optical device of claim 1, wherein the substrate comprises a crystalographically-etched reflector facet in a surface thereof at the edge, and the optoelectronic component is disposed over the reflector facet to permit optical communication between the reflector facet and the optoelectronic component.

10. The micro-optical device of claim 1, wherein the optoelectronic component is hermetically enclosed.

11. The micro-optical device of claim 1, wherein the substrate has an upper surface, and the optical fiber has an optical path along the upper surface.

12. The micro-optical device of claim 11, wherein the optical fiber is disposed in a groove formed in the upper surface.

* * * * *